S. TSURU.
LEMON JUICE EXTRACTOR.
APPLICATION FILED OCT. 7, 1913.
1,105,114.
Patented July 28, 1914.
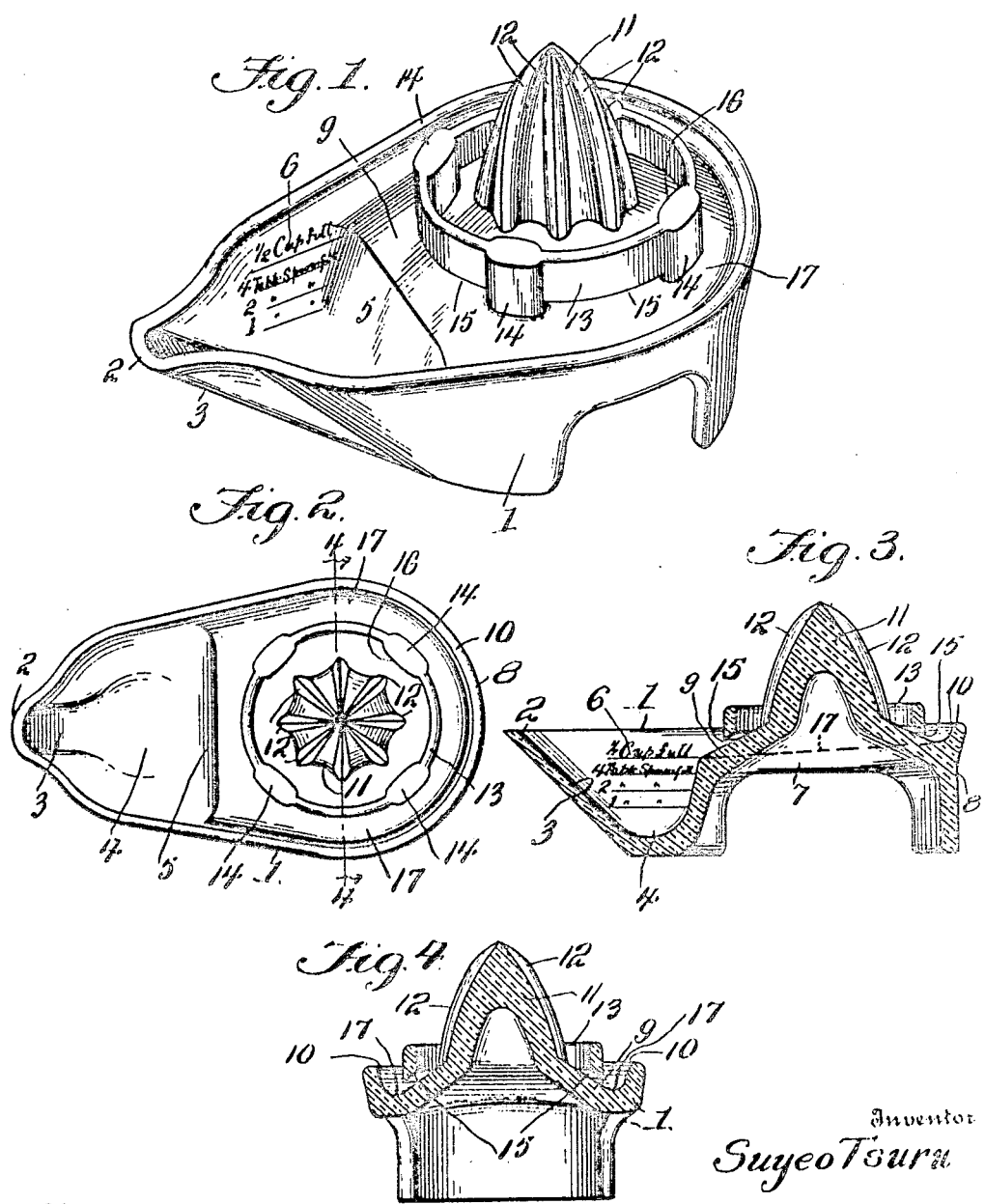
Inventor
Suyeo Tsuru
Witnesses
By Victor J. Evans
Attorney

UNITED STATES PATENT OFFICE.

SUYEO TSURU, OF NEWBURGH, NEW YORK.

LEMON-JUICE EXTRACTOR.

1,105,114.

Specification of Letters Patent.  Patented July 28, 1914.

Application filed October 7, 1913. Serial No. 793,930.

*To all whom it may concern:*

Be it known that I, SUYEO TSURU, a subject of Emperor of Japan, residing at Newburgh, in the county of Orange and State of New York, have invented new and useful Improvements in Lemon-Juice Extractors, of which the following is a specification.

The present invention relates to new and useful improvements in lemon juice extractors.

An object of the invention is to so construct a lemon juice extractor which may be in the form of a cone and being provided with ribs and seated upon an inclined base and surrounded by a strainer, the said strainer leading to a reservoir or receptacle which is provided with a pouring mouth and which is graduated so that the exact quantity of the juice may be determined.

A further object of the invention is the construction of a lemon juice extractor of glass or other acid-proof material which has a cone-shaped extractor that is surrounded by an annular strainer, the strainer at certain points being provided with enlargements and having small openings between the said enlargements, the enlarged portions adapted to reinforce the strainer as well as to serve in compressing the fruit toward the extractor, thus materially facilitating the process of extracting the juice from the pulp of the fruit.

A still further object of the invention is the provision of an effective device of this class which is simple in construction, inexpensive and which will accomplish the result for which it is devised with ease and with accuracy.

With the above and other objects in view, the invention consists in the construction, combination and arrangement of parts set forth in the following specification and falling within the scope of the appended claims.

In the drawings: Figure 1 is a perspective view of my improved device, Fig. 2 is a top plan view of the same, Fig. 3 is a central longitudinal sectional view of the same, and Fig. 4 is a transverse sectional view taken on the line 4—4 of Fig. 2.

My improvement includes a juice-receiving receptacle 1 which has its opposite walls curved at its bottom and its bottom rounded. The rounded side walls preferably converge toward the center of said receptacle to provide the said receptacle with a mouth 2, and the central wall of the mouth is preferably slightly concaved or rounded, as at 3, and inclines gradually to the rounded bottom 4 of said receptacle. The mouth is provided upon what I will term the front of the receptacle, and the rear wall of said receptacle is beveled inwardly and upwardly from its bottom 4, as indicated by the numeral 5. The inclined wall serves to direct the expressed juice to the receptacle, and the said receptacle is provided upon one or both of its sides with graduating marks 6 which indicate the quantity of the juice within the receptacle, the marks shown in the drawings indicating one, two and four table-spoonfulls and one-half a cup full. The device is preferably formed of glass, so that the graduations may be perceptible from either side of the device as well as from the center of the receptacle. Of course, when the device is constructed of other material, the graduations are arranged upon the opposite inner walls of the receptacle. The inclined wall 5 is supported by a continuous circular web 7 and terminating in a plane with the flat lower wall of the receptacle 1, so that the device may be sustained in a perfect horizontal position. The inclined wall 6 joins with a continuous declivous or frusto-conical wall 9 which is inclined from its connection with the said wall 5 to the upper portion of the rear wall 8 of the device, and the said rear wall above the frusto-conical wall or portion 9 is projected to provide a continuation or bead 10 which is arranged in a line with the upper wall or edge of the receptacle 1. The declivous surface 9 is centrally provided with a cone-shaped extractor 11, the same being provided with spaced ribs 12, which materially assist in extracting the juice from the pulp of the fruit when the lemon is rotated upon the extractor.

Formed with the declivous surface 9 and spaced a suitable distance from the base of the extractor 11 is a strainer 13. This strainer embodies a circular member or ring which at certain points, is provided with arcuate reinforcements 14, the said reinforced portions being preferably arranged in pairs which are disposed diametrically opposite each other, and the said reinforcements extend both upon the exterior and interior of the ring-shaped strainer 13. The ring-shaped strainer 13 between its enlargements 14 and at its juncture with the declivous surface 9 is slotted or otherwise provided with openings 15, one continuous opening being arranged between each pair of the enlargements. The inner arcuate walls 16 of the enlargements or reinforcing members 14 serve as abutments or means for compressing the portions of the fruit contacted thereby toward the strainer 11, thus materially assisting the strainer in extracting all the juice from the fruit, the juice or extract passing through the openings 15 over and being directed by the declivous surface 9 and from thence to the inclined surface 17 which is arranged between the bead 10 and the opposite side of the device (as heretofore referred to) to the receptacle 1. The ring-shaped strainer 13 is of a sufficient height to receive all of the pulp from the fruit, while the openings or passages 15 are only sufficient to permit of the juice or extract passing therethrough to the receptacle.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what I claim is:

1. A lemon juice extractor consisting of a receptacle having a pouring mouth and having its sides graduated, an extractor arranged to the rear of the receptacle, a ring-shaped strainer surrounding the extractor, said strainer having enlarged reinforcing members spaced from each other and providing inwardly and outwardly extending rounded walls, and the strainer between the reinforcements having its lower edge formed with openings.

2. A lemon juice extractor comprising a juice receiving receptacle, a declivous surface arranged to one side of and above the receptacle, an extractor extending upwardly from the central portion of the declivous surface, a ring-shaped member upon the declivous surface spaced from the extractor and elevated at points above the declivous surface.

3. An extractor including a juice receptacle, a declivous surface formed with the rear wall of the receptacle and extending above the said receptacle, a cone-shaped extractor arranged centrally of the declivous surface, a ring surrounding the extractor, said ring having openings which communicate with the declivous surface, and the said ring having its inner wall provided with abutments which are adapted to co-act with the extractor in extracting the juice from the fruit.

4. A vessel having a continuous flange, and one portion depressed to provide a receptacle, a declivous surface arranged to the rear of the receptacle and communicating therewith, the portion of the receptacle between the flange of the said declivous surface being inclined toward the receptacle, a cone-shaped extractor arising centrally from the declivous surface, a ring strainer upon the said declivous surface surrounding the extractor and spaced therefrom, the said ring having openings which communicate with the declivous surface and the said ring having spaced inwardly projecting elements, substantially as and for the purpose set forth.

In testimony whereof I affix my signature in presence of two witnesses.

SUYEO TSURU.

Witnesses:
JOHN A. DOREGLE,
GEO. A. BYRNE.

Copies of this patent may be obtained for five cents each, by addressing the "Commissioner of Patents, Washington, D. C."